United States Patent Office 2,922,812
Patented Jan. 26, 1960

2,922,812

SULFUR-CONTAINING ESTERS OF PHOSPHORIC ACID AND METHODS OF PREPARATION

Everett E. Gilbert, Morris Township, Morris County, N.J., and Catherine J. McGough, Kew Gardens, N.Y., assignors to Allied Chemical Corporation, a corporation of New York No Drawing. Application November 26, 1956
Serial No. 624,206

6 Claims. (Cl. 260—461)

This invention relates to new sulfur-containing esters of phosphoric acid useful as insecticidal toxicants and for other purposes and to the preparation of such compounds.

These new sulfur-containing phosphoric acid esters conform to the general formula $$(R'O)_2 \overset{O}{\underset{\|}{P}}S-R-S\overset{O}{\underset{\|}{P}}(OR')_2$$

in which R represents an aryl or substituted aryl radical and R' represents an alkyl, substituted alkyl, cycloalkyl or alkenyl radical.

A sulfur-containing phosphoric acid ester of the general formula given above may be prepared according to certain aspects of the invention by reacting an organic phosphite of the general formula $$(R'O)_3P$$

in which R' has the meaning shown above, with an aromatic disulfonyl chloride of the general formula $$ClSO_2-R-SO_2Cl$$

in which R has the meaning shown above, and recovering said sulfur-containing phosphoric acid ester.

The reaction between the organic phosphites and the aromatic disulfonyl chlorides takes place in accordance with the following equation:

$$6P(OR')_3 + ClSO_2-R-SO_2Cl \longrightarrow$$

$$(R'O)_2 \overset{O}{\underset{\|}{P}}S-R-S\overset{O}{\underset{\|}{P}}(OR')_2 + 4(R'O)_3PO + 2R'Cl$$

Illustrative of suitable aromatic disulfonyl chlorides are 1-chlorobenzene-2,4-disulfonyl chloride; diphenyl-oxide-4,4'-disulfonyl chloride; 1,4-dichlorobenzene-2,5-disulfonyl chloride; 1-methylbenzene-2,4-disulfonyl chloride; benzene-1,3-disulfonyl chloride; biphenyl-4,4'-disulfonyl chloride; dichlorodiphenyloxide-2,2'-disulfonyl chloride; naphthalene-2,7-disulfonyl chloride; diphenylmethane-4,4'-disulfonyl chloride and hexachlorodiphenylmethane-2,2'-disulfonyl chloride. The disulfonyl chlorides may be prepared by any standard procedure such as that given on page 296 in Groggin's Unit Processes (4th edition).

Illustrative of suitable organic phosphites are trimethyl, triethyl, tributyl, tri(betachloroethyl), triallyl and tricyclohexyl phosphites. The lower trialkyl phosphites in which the alkyl groups contain 4 or less carbon atoms are preferred reactants, but other phosphites of the general formula given above, including mixed phosphites containing different alkyl, substituted alkyl, cycloalkyl or alkenyl radicals may be effectively employed.

It is preferred that the organic phosphite and aromatic disulfonyl chloride be employed in approximately stoichiometric amounts, i.e. about 6 mols of phosphite for each mol of disulfonyl chloride, to prepare the novel sulfur-containing phosphoric acid esters of the invention. However, higher phosphite-disulfonyl chloride mol ratios are also suitable.

High yields of the desired sulfur-containing esters are obtained by carrying out the reaction in the presence of an inert solvent, preferably one lower boiling than the phosphoric acid ester or esters produced. Suitable inert solvents include ethylene dichloride, ethyl ether, petroleum ether, carbon tetrachloride, toluene and benzene. When reaction is completed, lower boiling solvent so used may be recovered for reuse by simple distillation at atmospheric or lower pressure.

The reaction may be carried out at any temperature up to the decomposition point of the reactants. Generally, however, the reaction is quite vigorous during the addition of the reactants, and cooling is desirable to retard the reaction. In other cases, gentle warming is required to initiate reaction.

As may be seen from the equation illustrating the reaction of the organic phosphites with the aromatic disulfonyl chlorides, phosphoric acid esters of the general formula $$(R'O)_3PO$$

in which R' has the meaning shown above, are produced during the course of the reaction. These phosphoric acid esters are well known articles of commerce finding usage, for example, as solvents or plasticizers. Since heretofore, these esters have not been produced by such a reaction, their preparation constitutes another feature of our invention. The phosphoric acid esters may be separated from other reaction products by any suitable method such as by vacuum distillation usually at a temperature higher than employed for recovery of preferred lower boiling solvent. We have found, however, that these esters, especially lower trialkyl phosphates are satisfactory inert carriers for the sulfur-containing phosphoric acid esters having active insecticidal properties. In addition, when they are produced in accordance with the invention by reaction of organic phosphites with aromatic disulfonyl chlorides, they are obtained in sufficient quantity that the entire reaction product containing sulfur-containing ester of phosphoric acid as active insecticidal agent and phosphoric acid ester as inert carrier may be applied as produced or, diluted, if desired, to the substance to be protected from insects.

The following examples are given for the purpose of illustrating the present invention, but are not intended to be limiting on the scope thereof. In the examples parts are by weight.

*Example 1.*—100 parts of triethyl phosphite were added dropwise to a solution of 37.4 parts of 1-chlorobenzene-2,4-disulfonyl chloride dissolved in 144 parts of ethyl ether, the temperature being maintained below about 30° C. The reaction mixture was allowed to stand at room temperature for several hours and was then heated on a steam bath for 10 hours to complete the reaction. The solution was then vacuum distilled at 3 mm. mercury pressure and heated in an oil bath at 150° C. to remove any remaining ethyl chloride formed during the reaction and as much of the ethyl phosphate formed as possible. The product, an oily liquid, comprising the sulfur-containing phosphoric acid ester having the formula

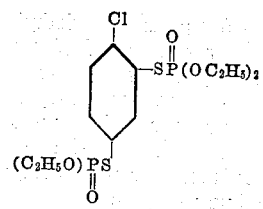

constituted 47 parts (104.5% of theory).

*Example 2.*—37 parts of diphenyloxide-4,4'-disulfonyl chloride were reacted with 100 parts of triethyl phosphite in accordance with the procedure outlined in Example 1. The product, a waxy solid, comprising the sulfur-containing phosphoric acid ester product having the formula

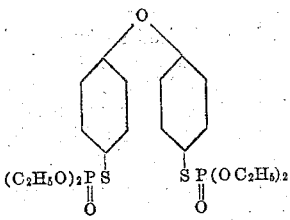

constituted 53 parts (103.5% of theory).

*Example 3.*—40.8 parts of 1,4-dichlorobenzene-2,5-disulfonyl chloride were reacted with 100 parts of triethyl phosphite in accordance with the procedure outlined in Example 1. The product, a semi-solid, comprising the sulfur-containing phosphoric acid ester having the formula

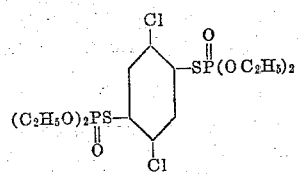

constituted 61 parts (126% of theory).

As shown above, yields of Examples 1–3 were in excess of theory. The high values were due to incomplete removal of by-product phosphate.

*Examples 4, 5, 6, 7 and 8.*—In each of these runs the organic phosphite was added dropwise at a temperature of less than 25° C. to a solution of the aromatic disulfonyl chloride in 100 parts of benzene. The mol ratio of organic phosphite to aromatic disulfonyl chloride employed in each run was about 6:1. After the addition of the organic phosphite was completed, the reaction mixture was allowed to stand at room temperature for 5 hours and was then heated overnight on a steam bath to complete the reaction. The resultant solution was then heated to a temperature of approximately 95° C. under a vacuum of 5 mm. mercury pressure to remove any remaining organic chloride formed during the reaction and any remaining benzene solvent. In each case, the product was a liquid comprising a mixture of organic phosphate and sulfur-containing phosphoric acid ester. Details of each run are outlined in the table below.

the sulfur-containing phosphoric acid ester having the formula

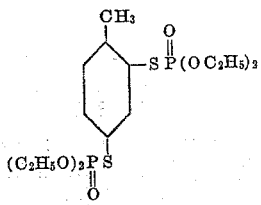

constituted 100 parts (86% of theory).

*Example 10.*—100 parts of triethyl phosphite were reacted with 27.5 parts of benzene-1,3-disulfonyl chloride in accordance with the procedure described in Example 9. The product, a liquid, comprising triethyl phosphate and the sulfur-containing phosphoric acid ester having the formula

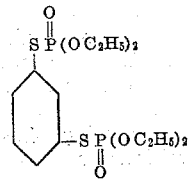

constituted 96 parts (84% of theory).

*Example 11.*—100 parts of triethyl phosphite were reacted with 35.1 parts of biphenyl-4,4'-disulfonyl chloride in accordance with the procedure outlined in Example 9. The product, a liquid, comprising triethyl phosphate and the sulfur-containing phosphoric acid ester having the formula

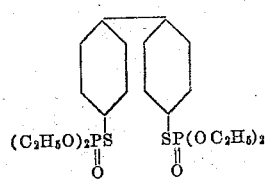

constituted 97 parts (87% of theory).

*Example 12.*—100 parts of triethyl phosphite were reacted with 43.6 parts of dichlorodiphenyloxide-2,2'-disulfonyl chloride. The product, a liquid, comprising triethyl phosphate and sulfur-containing phosphoric acid ester, constituted 115 parts (89% of theory).

*Example 13.*—100 parts of triethyl phosphite were reacted with 32.5 parts of naphthalene-2,7-disulfonyl chloride in accordance with the procedure outlined in

|  | Organic Phosphite | Parts of Organic Phosphite | Disulfonyl Chloride | Parts of Disulfonyl Chloride | Total Parts of Organic Phosphate and Sulfur-Containing Phosphoric Acid Ester Product | Yield Percent Theory |
|---|---|---|---|---|---|---|
| Ex. 4 | tributyl | 75.9 | 1-chlorobenzene-2,4- | 15.5 | 82 | 100 |
| Ex. 5 | do | 75.9 | diphenyloxide-4,4'- | 18.5 | 85 | 100 |
| Ex. 6 | tri(2-ethylhexyl) | 125.4 | benzene-1,3- | 14 | 124 | 99 |
| Ex. 7 | tri(betachloroethyl) | 81 | 1-chlorobenzene-2,4- | 15.5 | 86 | 99 |
| Ex. 8 | do | 81 | benzene-1,3- | 14 | 84 | 100 |

*Example 9.*—100 parts of triethyl phosphite were added dropwise to a solution of 28.9 parts of 1-methylbenzene-2,4-disulfonyl chloride in about 70 parts of petroleum ether, the temperature being maintained below about 30° C. The reaction mixture was allowed to stand at room temperature for several days to complete the reaction. The solution was then vacuum distilled to remove any remaining ethyl chloride formed during the reaction and any remaining petroleum ether solvent. The product, a liquid, comprising triethyl phosphate and Example 9. The product, a liquid, comprising triethyl phosphate and the sulfur-containing phosphoric acid ester having the formula

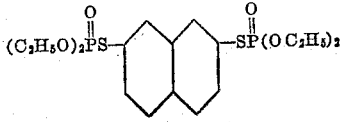

constituted 99 parts (83% of theory).

*Example 14.*—100 parts of triethyl phosphite were reacted with about 43 parts of diphenylmethane-4,4'-disulfonyl chloride in accordance with the procedure outlined in Example 9. The product, a liquid, comprising triethyl phosphate and the sulfur-containing phosphoric acid ester having the formula

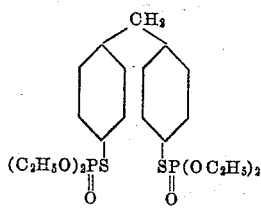

constituted 104 parts (85% of theory).

*Example 15.*—About 150 parts of triethyl phosphite were added slowly to a solution of 56 parts of hexachlorodiphenylmethane-2,2'-disulfonyl chloride in 88 parts of benzene. The reaction mixture was allowed to stand at room temperature for several days and was then heated on a steam bath for 8 hours to complete the reaction. The product, a heavy brown liquid, comprising triethyl phosphate and sulfur-containing phosphoric acid ester, constituted 96 parts (67% of theory).

*Example 16.*—111 parts of trimethyl phosphite were added dropwise with stirring over a period of about ½ hour to a solution of 46.3 parts of 1-chlorobenzene-2,4-disulfonyl chloride dissolved in 108 parts of ethyl ether, the temperature being maintained at 10° to 20° C. After stirring for 15 minutes more, the reaction mixture was allowed to come to room temperature while stirring over a two hour period. Methyl chloride formed during the reaction and the ether solvent were distilled off. The residue was vacuum distilled at 1 to 2 mm. mercury pressure to remove trimethyl phosphate formed during the reaction. The product, a light brown liquid, comprising the sulfur-containing phosphoric acid ester having the formula

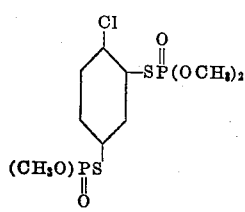

constituted 53 parts (89.3% of theory).

As indicated above, products of the type produced by this invention find valuable application as active insecticidal toxicants. Insecticidal properties of certain sulfur-containing phosphoric acid esters typical of those embraced within the scope of this invention are indicated in the following table:

| Sulfur-Containing Phosphoric Acid Ester from— | Formulation | Toxicity to Mexican Bean Beetle Larvae at Dosage Indicated [1] | Toxicity to Mites at Dosage Indicated [1] | Toxicity to Pea Aphids at Dosage Indicated [1] |
|---|---|---|---|---|
| Example 1 | 25% emulsible concentrate | 100% at 1/16 pt | 97% at 1/32 pt | |
| Example 2 | 12.5% emulsible concentrate | 100% at 1 qt | | |
| Example 3 | do | | 98% at ½ pt | |
| Example 9 | do | 100% at ½ pt | 91% at ½ pt | 67% at 1 pt. |
| Example 10 | 12.5% wettable powder | 100% at ½ lb | | 82% at 2 lbs. |
| Example 12 | 12.5% emulsible concentrate | | 95% at ¼ pt | |
| Example 16 | 25% wettable powder | 100% at ½ lb | 100% at 1/16 lb | |

[1] Dosage per 100 gallons spray mixture (formulated with water).

The 12.5% emulsible concentrates used in the above tests comprised 12.5% by weight sulfur-containing ester of phosphoric acid (toxicant), 12.5% by weight triethyl phosphate (inert solvent), 70% by weight xylene (inert solvent) and 5% by weight "Triton X-155" (a commercial emulsifier). The 25% emulsible concentrate comprised 25% by weight sulfur-containing ester of phosphoric acid (toxicant), 70% by weight xylene (inert solvent) and 5% by weight "Triton X-155." The 12.5% wettable powder used in the tests comprised 12.5% by weight sulfur-containing ester of phosphoric acid (toxicant), 12.5% by weight triethyl phosphate (inert solvent), 73% by weight "Attaclay" (a commercial attapulgite clay), 1% by weight "Nacconol SW" (a commercial suspending agent) and 1% by weight "Elvanol 51–05" (a commercial polyvinyl alcohol dispersing agent). The 25% wettable powder comprised 25% by weight sulfur-containing ester of phosphoric acid (toxicant), 73% by weight "Attaclay," 1% by weight "Nacconol SW" and 1% by weight "Elvanol 51–05."

The tests on toxicity to Mexican bean bettle larvae (*Epilachna varivestis*) were run by dipping cranberry bean plants in the spray mixture, drying the plants and exposing them to the larvae in a spherical wire cage for 3 or 4 days.

The tests on toxicity to mites (*Tetranychus bimaculatus*) were run by infesting cranberry bean plants with the mites, dipping the plants in the spray mixture and allowing the plants to stand for 3 or 4 days.

The tests on toxicity to pea aphids (*Macrosiphum pisi*) were run by placing the pea aphids in an open cage, spraying them with the spray mixture, and then confining the sprayed aphids to young broad-bean plants in a spherical wire cage for 3 days.

Although the above examples are limited to use of aromatic disulfonyl chlorides as reactants, alkyl and substituted alkyl disulfonyl chlorides such as butane disulfonyl chloride and betachloroethyl disulfonyl chloride are also utilizable in the process of this invention.

This application is a continuation-in-part of application Serial No. 397,004, filed December 8, 1953.

We claim:

1. A method of preparing a sulfur-containing phosphoric acid ester of the general formula

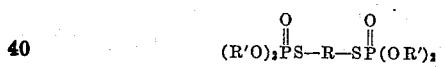

in which R is a member of the group consisting of phenyl, biphenyl, naphthyl, chloro-substituted phenyl, phenoxy-substituted phenyl, chlorophenoxy-substituted phenyl and lower alkyl-substituted phenyl radicals and R' is a member of the group consisting of lower alkyl, chloro-substituted lower alkyl, allyl and cyclohexyl radicals, which comprises reacting an organic phosphite of the general formula

in which R' is a member of the group consisting of lower alkyl, chloro-substituted lower alkyl, allyl and cyclohexyl radicals with an aromatic disulfonyl chloride of the general formula

in which R is a member of the group consisting of phenyl, biphenyl, naphthyl, choro-substituted phenyl, phenoxy-substituted phenyl, chlorophenoxy-substituted phenyl and lower alkyl-substituted phenyl radicals, said organic phosphite and aromatic disulfonyl chloride being employed in ratio of at least about 6 mols of organic phosphite to one mol of aromatic disulfonyl chloride.

2. The process of claim 1 in which the organic phosphite and the aromatic disulfonyl chloride are employed in ratio of about 6 mols of organic phosphite to 1 mol of aromatic disulfonyl chloride.

3. The process of claim 2 in which the reaction is carried out in the presence of an inert solvent.

4. A method of preparing a sulfur-containing phosphoric acid ester of the general formula

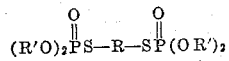

in which R is a member of the group consisting of phenyl, biphenyl, naphthyl, chloro-substituted phenyl, phenoxy-substituted phenyl, chlorophenoxy phenyl and lower alkyl-substituted phenyl radicals and R' is a lower alkyl radical, which comprises reacting an organic phosphite of the general formula $(R'O)_3P$ in which R' is a lower alkyl radical with an aromatic disulfonyl chloride of the general formula $ClSO_2—R—SO_2Cl$ in which R is a member of the group consisting of phenyl, biphenyl, naphthyl, chloro-substituted phenyl, phenoxy-substituted phenyl, chlorophenoxy-substituted phenyl and lower alkyl-substituted phenyl radicals, said organic phosphite and aromatic disulfonyl chloride being employed in ratio of at least about 6 mols of organic phosphite to one mol of aromatic disulfonyl chloride.

5. A method of preparing the sulfur-containing phosphoric acid ester having the formula

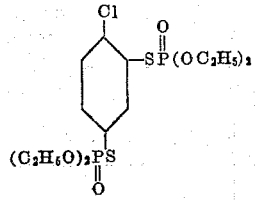

which comprises reacting triethyl phosphite with 1-chloro-benzene-2,4-disulfonyl chloride, said reactants being employed in the ratio of about 6 mols of triethyl phosphite to 1 mol of disulfonyl chloride in the presence of an inert solvent, and recovering said sulfur-containing phosphoric acid ester from the reaction mixture.

6. A method of preparing the sulfur-containing phosphoric acid ester having the formula

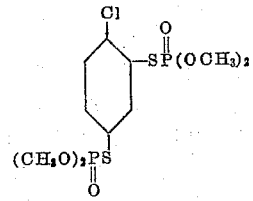

which comprises reacting trimethyl phosphite with 1-chlorobenzene-2,4-disulfonyl chloride, said reactants being employed in the ratio of about 6 mols of trimethyl phosphite to 1 mol of disulfonyl chloride, in the presence of an inert solvent, and recovering said sulfur-containing phosphoric acid ester from the reaction mixture.

References Cited in the file of this patent

UNITED STATES PATENTS

| | | |
|---|---|---|
| 2,266,514 | Romieux et al. | Dec. 16, 1941 |
| 2,690,450 | Gilbert | Sept. 28, 1954 |

OTHER REFERENCES

Knauer: Ber. Deut. Chem., 27, 2566–2569 (1894).

Mandelbaum, Jr.: Gen. Chem. U.S.S.R., 23, 437–440 (1953), English translation.

UNITED STATES PATENT OFFICE

CERTIFICATE OF CORRECTION

Patent No. 2,922,812                      January 26, 1960

Everett E. Gilbert et al.

It is hereby certified that error appears in the printed specification of the above numbered patent requiring correction and that the said Letters Patent should read as corrected below.

Column 2, line 67, for that portion of the formula reading "$(C_2H_5O)PS$" read -- $(C_2H_5O)_2PS$ --; column 5, line 46, for that portion of the formula reading "$(CH_3O)PS$" read -- $(CH_3O)_2PS$ --; column 7, line 14, for "chlorophenoxy phenyl" read -- chlorophenoxy-substituted phenyl --.

Signed and sealed this 19th day of July 1960.

(SEAL)
Attest:

KARL H. AXLINE                      ROBERT C. WATSON
Attesting Officer                    Commissioner of Patents